United States Patent
Kim et al.

(10) Patent No.: US 9,357,363 B2
(45) Date of Patent: *May 31, 2016

(54) METHOD FOR DISPLAYING TRANSMISSION STATUS OF MMS (MULTIMEDIA MESSAGING SERVICE) MESSAGE AND TELECOMMUNICATION TERMINAL USING THE METHOD

(71) Applicant: PANTECH CO., LTD., Seoul (KR)

(72) Inventors: Jung Suk Kim, Goyang-si (KR); Sang Sung Lim, Seoul (KR); Jeong Won Oh, Seoul (KR)

(73) Assignee: Pantech Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/816,736

(22) Filed: Aug. 3, 2015

(65) Prior Publication Data

US 2015/0341761 A1 Nov. 26, 2015

Related U.S. Application Data

(63) Continuation of application No. 12/364,085, filed on Feb. 2, 2009, now Pat. No. 9,100,496.

(30) Foreign Application Priority Data

May 8, 2008 (KR) .......................... 10-2008-0042843

(51) Int. Cl.
*H04W 72/00* (2009.01)
*H04W 4/14* (2009.01)
(Continued)

(52) U.S. Cl.
CPC .................. *H04W 4/14* (2013.01); *H04L 51/10* (2013.01); *H04L 51/38* (2013.01); *H04M 1/72547* (2013.01); *H04M 1/72544* (2013.01)

(58) Field of Classification Search
CPC ....... H04W 4/206; H04W 36/02; H04W 4/14; H04W 80/04; H04W 8/08; H04W 92/02; H04W 4/02; H04W 4/18; H04L 69/08; H04L 12/5895; H04L 29/06027; H04L 29/12528; H04L 51/38; H04L 61/2564; H04L 61/2575; H04L 65/1083; H04L 65/403; H04L 63/0428; H04L 63/0853; H04L 12/6418; H04L 67/04; H04L 41/0856; H04L 47/801; H04L 65/601; H04L 67/06
USPC ........................................................ 455/466
See application file for complete search history.

(56) References Cited

U.S. PATENT DOCUMENTS 9,100,496 B2 * 8/2015 Kim ................. H04M 1/72547
2001/0011031 A1 8/2001 Tsutomu Okawa
(Continued)

FOREIGN PATENT DOCUMENTS

KR 10-0620331 8/2006

OTHER PUBLICATIONS

European Search Report dated Aug. 5, 2009.
(Continued)

*Primary Examiner* — Nimesh Patel
(74) *Attorney, Agent, or Firm* — H.C. Park & Associates, PLC

(57) ABSTRACT

A method for displaying transmission status of a multimedia messaging service (MMS) message and a telecommunication terminal using the method, including displaying the currently transmitting content and transmission progress of the MMS message while the telecommunication terminal transmits the MMS message. A user can check the content of the MMS message being currently transmitted together with the transmission progress of the MMS message. The user also can cancel the transmission of the erroneous MMS message before completing the transmission of the MMS message.

12 Claims, 5 Drawing Sheets

(51) Int. Cl.
*H04L 12/58* (2006.01)
*H04M 1/725* (2006.01)

(56) References Cited

U.S. PATENT DOCUMENTS

| | | |
|---|---|---|
| 2006/0041848 A1 | 2/2006 | Luigi Lira |
| 2006/0117040 A1 | 6/2006 | Begeja et al. |
| 2006/0200568 A1 | 9/2006 | Kim |
| 2007/0066310 A1 | 3/2007 | Haar et al. |
| 2008/0160906 A1* | 7/2008 | Ranjan .................. H04H 60/80 455/3.01 |

OTHER PUBLICATIONS

Non Final Office Action issued on Apr. 5, 2011, in U.S. Appl. No. 12/364,085.

Final Office Action issued on Sep. 23, 2011, in U.S. Appl. No. 12/364,085.

Non Final Office Action issued on Oct. 5, 2012, in U.S. Appl. No. 12/364,085.

Final Office Action issued on Apr. 12, 2013, in U.S. Appl. No. 12/364,085.

Non Final Office Action issued on Sep. 25, 2013, in U.S. Appl. No. 12/364,085.

Final Office Action issued on Apr. 16, 2014, in U.S. Appl. No. 12/364,085.

Non Final Office Action issued on Sep. 29, 2014, in U.S. Appl. No. 12/364,085.

Notice of Allowance issued on Mar. 30, 2015, in U.S. Appl. No. 12/364,085.

* cited by examiner

METHOD FOR DISPLAYING TRANSMISSION STATUS OF MMS (MULTIMEDIA MESSAGING SERVICE) MESSAGE AND TELECOMMUNICATION TERMINAL USING THE METHOD

CROSS-REFERENCE TO RELATED APPLICATION

This application is a continuation of U.S. patent application Ser. No. 12/364,085, filed on Feb. 2, 2009 and claims priority from and the benefit of Korean Patent Application No. 10-2008-0042843, filed on May 8, 2008, which is hereby incorporated by reference for all purposes as if fully set forth herein.

BACKGROUND OF THE INVENTION

1. Field of the Invention

The present invention relates to a method for displaying transmission status of a multimedia messaging service (MMS) message and a telecommunication terminal using the method, and more particularly, to a method in which the content of a portion of the MMS message currently being transmitted from a telecommunication terminal is displayed so that a user can check the transmission status of the MMS message, and a telecommunication terminal using the method.

2. Discussion of the Background

In general, when a multimedia messaging service (MMS) message is transmitted using a telecommunication terminal, a media file, including media such as images, video, or text, can be attached to the MMS message to transmit with the MMS message.

While transmitting an MMS message, however, a user of the telecommunication terminal cannot check the content of the transmitted MMS message. Therefore, due to the user's mistake, another media file that is not desired to be transmitted may be attached to the MMS message, or if the content of the message is created erroneously, the erroneously created MMS message may be transmitted.

In addition, when the MMS message is being transmitted, the telecommunication terminal displays the current transmission progress on a screen to inform the user of the message's transmission progress, but the user cannot check the part of the MMS message that is being currently transmitted.

The above information disclosed in this Background section is only for enhancement of understanding of the background.

SUMMARY OF THE INVENTION

This invention provides a method for displaying transmission status of a multimedia messaging service (MMS) message in which the content of a currently transmitted MMS message is displayed so that a user can check the transmission status of the MMS message and the part of the message currently being transmitted, and a telecommunication terminal using the method.

This invention also provides a method for displaying transmission status of an MMS message in which the content of a currently transmitted message is displayed so that a user can check the part of the message currently being transmitted, and if the MMS message is erroneously created, the transmission of the MMS message can be canceled before the transmission is completed, and a telecommunication terminal using the method.

Additional features of the invention will be set forth in the description which follows, and in part will be apparent from the description, or may be learned by practice of the invention.

This invention discloses a method of displaying an MMS message transmission including collecting MMS message construction information for the MMS message, transmitting the MMS message, and displaying a portion of data included in the MMS message on a display unit while transmitting the MMS message.

This invention also discloses a telecommunication terminal to display a multimedia messaging service (MMS) message transmission status. The telecommunication terminal includes a storage unit to store an MMS message, a display unit to display content of the MMS message on a screen while the MMS message is being transmitted, a telecommunication unit to read the content of the MMS message from the storage unit and to transmit the MMS message, and a controller to collect MMS message construction information upon an instruction to transmit the MMS message, and to control the display unit to display currently transmitted unit data of the MMS message based on the MMS message construction information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
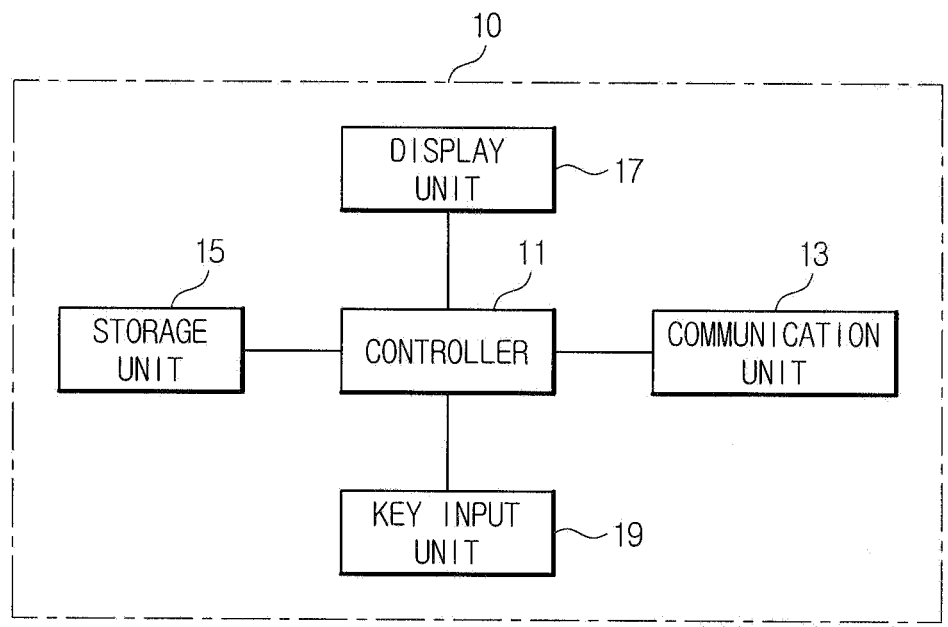
FIG. 1 illustrates a telecommunication terminal for displaying an MMS message transmission status according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereinafter, example embodiments of the present invention will be described in detail with reference to the accompanying drawings.

When a telecommunication terminal according to an exemplary embodiment of the present invention transmits an MMS message, the transmission progress of the MMS message is displayed and the currently transmitting content of the MMS message is displayed.

The telecommunication terminal 10 shown in FIG. 1 includes a controller 11, a communication unit 13, a storage unit 15, a display unit 17, and a key input unit 19.

The communication unit 13 is driven by the controller 11 to transmit the MMS message. The display unit 17 is driven by the controller 11 to display a screen on which the MMS message is created and/or edited by a user, and to display a message transmission status while the MMS message is transmitting. In addition, the key input unit 19 receives user input information for creating the MMS message and for transmitting the MMS message to the controller 11 so that the MMS message transmits. The storage unit 15 stores the data generated when the communication terminal 10 operates in accordance with the control of the controller 11. In detail, the storage unit 15 stores the MMS message created by a user and outputs the MMS message to the controller 11 when the MMS message is to be transmitted. The controller 11 controls the operation of the telecommunication terminal 10 and controls the creation and transmission of the MMS message in accordance with the instruction of the key input unit 19.

The controller 11 stores the MMS message created by the user manipulating the key input unit 19 in the storage unit 15 and, if the transmission of the MMS message is instructed by the key input unit 19, sequentially reads the MMS message stored in the storage unit 15 by the amount of set unit data to transmit the MMS message through the communication unit 13. In addition, under control of the controller 11, the transmission progress and the content of the MMS message currently being transmitted by the communication unit 13 are displayed on the display unit 17.

The controller 11 of the telecommunication terminal 10 stores the MMS message created by the user in the storage unit 15 and may retain the MMS message in the storage unit 15 after the message is transmitted. The MMS message created by the user and stored in the storage unit 15 may be divided into header data, text data, and attached data. For example, the header data may be in the form of a hypertext transfer protocol (HTTP) header. In addition, the text data that represents the content of the text of the message may be in the form of a hypertext markup language (HTML) body. In addition, the attached data added to the MMS message may be in the form of an attached media file having image information or video information. Alternately, in another exemplary embodiment of the present invention, the MMS message may not include text data, in which case the MMS message may include only an HTTP header and an attached media file. The remaining description will be for an MMS message that includes the HTTP header, the HTML body, and the attached media file. However, it will be understood that the HTML body may not be included if the MMS message does not include text data in an HTML body according to this description without deviating from the present invention.

As described above, the MMS message may be stored in the format including the HTTP header, the HTML body, and the attached media file. When instructed to transmit the MMS message, the controller 11 reads the stored MMS message and sequentially reads the MMS message in the order of the HTTP header, the HTML body, and the attached media file, by the amount of the set unit data to transmit the MMS message through the communication unit 13. Content such as a recipient number, a title, and transmitting time to the entire bibliographic information of the MMS message may be recorded in the HTTP header. Any text to be transmitted in the MMS message may be recorded in the HTML body. The image media and the text media may be recorded in the attached media file of the MMS message.

When the controller 11 is instructed to transmit the MMS message by the key input unit 19, the controller 11 collects the message construction information of the MMS message stored in the storage unit 15. That is, the controller 11 collects the MMS message construction information for determining the amount of data included in each of the HTTP header, the HTML body, and the attached media file. The controller 11 sequentially reads the MMS message from the storage unit 15 in the order of the HTTP header, the HTML body, and the attached media file, by the amount of the set unit data to transmit the MMS message. In addition, the controller 11 recognizes the part of the MMS message being currently transmitted from among the HTTP header, the HTML body, and the attached media file. The controller 11 does this by recognizing the first portion of data in the MMS message is associated with the HTTP header, and also has determined the amount of data included in the HTTP header. The controller 11 also recognizes that the second portion of data in the MMS message after the HTTP header is associated with the HTML body, and also has determined the amount of data included in the HTML body. The controller 11 also recognizes that the third portion of data in the MMS message after the HTML body is associated with the media file, and also has determined the amount of data included in the media file. Then, the controller 11 reads the content of the recognized part of the MMS message from the storage unit 15, displays the content of the recognized part on the display unit 17, and displays the transmission progress of the currently transmitted MMS message on the screen of the display unit 17.

If the controller 11 recognizes that the currently transmitted unit data corresponds to the HTTP header, the controller 11 reads the content of the HTTP header from the storage unit 15 and displays the content of the HTTP header on the screen of the display unit 17. If the controller 11 recognizes that the currently transmitted unit data corresponds to the HTML body, the controller 11 reads the content of the text recorded in the HTML body from the storage unit 15 and displays the content of the text on the screen of the display unit 17. If the controller 11 recognizes that the currently transmitted unit data corresponds to the attached media file, the controller 11 reads the content of the attached media file from the storage unit 15 and displays the content of the attached media file on the screen of the display unit 17. As described above, if the controller 11 displays the content of the currently transmitted MMS message on the screen of the display unit 17, the content of the transmitted MMS message is scrolled on the screen of the display unit 17 in the order of the HTTP header, the HTML body, and the attached media file.

In addition, when the controller 11 displays the content of the currently transmitted MMS message on the screen while transmitting the MMS message, the transmission progress of the MMS message is displayed on the display unit 17 in the form of a progress bar to regularly or continuously display the percentage of the entire MMS message that has been transmitted.

Figure 2:
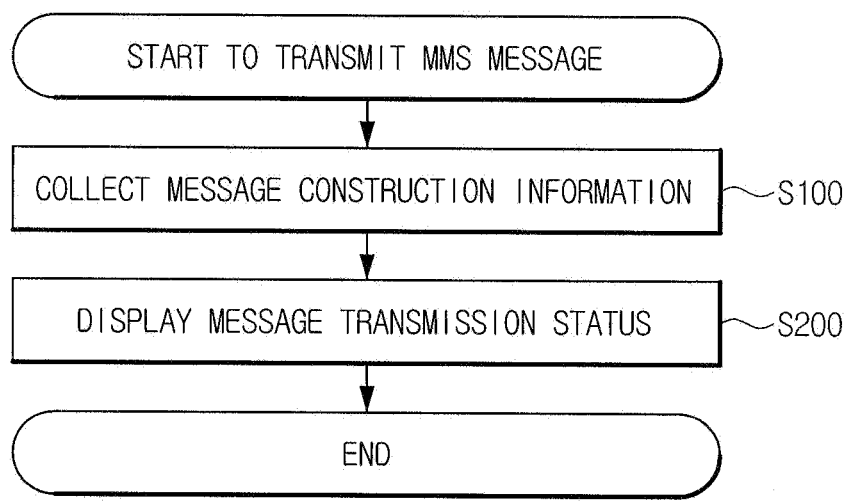
FIG. 2 is a flowchart illustrating a process of displaying the MMS message transmission status according to an exemplary embodiment of the present invention.

When the telecommunication terminal 10 having the above-described function displays the MMS message transmission status, the process illustrated in FIG. 2 is performed, which will be described hereinafter. FIG. 2 is a flowchart illustrating a process of displaying the MMS message transmission status according to an exemplary embodiment of the present invention.

First, an MMS message is created by the user of the telecommunication terminal 10, and the MMS message is stored in the storage unit 15 of the telecommunication terminal 10. If the user instructs the transmission of the MMS message by entering a command into the key input unit 19, the MMS message transmission begins. Specifically, the controller 11 of the telecommunication terminal 10 collects the message construction information of the MMS message stored in the storage unit 15. That is, the controller 11 collects the MMS message construction information for recognizing how much data is included in each of the HTTP header, the HTML body, and the attached media file of the MMS message (S100).

The controller 11 of the telecommunication terminal 10 sequentially reads the MMS message from the storage unit 15 in the order of the HTTP header, the HTML body, and the attached media file, by the amount of the set unit data to transmit the MMS message using the communication unit 13. In addition, the controller 11 recognizes a part of the MMS message from among the HTTP header, the HTML body, and the attached media file that form the MMS message that is currently being transmitted based on the MMS message construction information collected in S100. Then, the controller 11 reads the content of the recognized part of the MMS message from the storage unit 15, displays the content of the recognized part on the display unit 17, and displays the transmission progress of the currently transmitted MMS message on the screen of the display unit 17. The transmission progress of the MMS message is displayed on the screen of the display unit 17 in the form of the progress bar to display the MMS message transmission status (S200).

Figure 3:
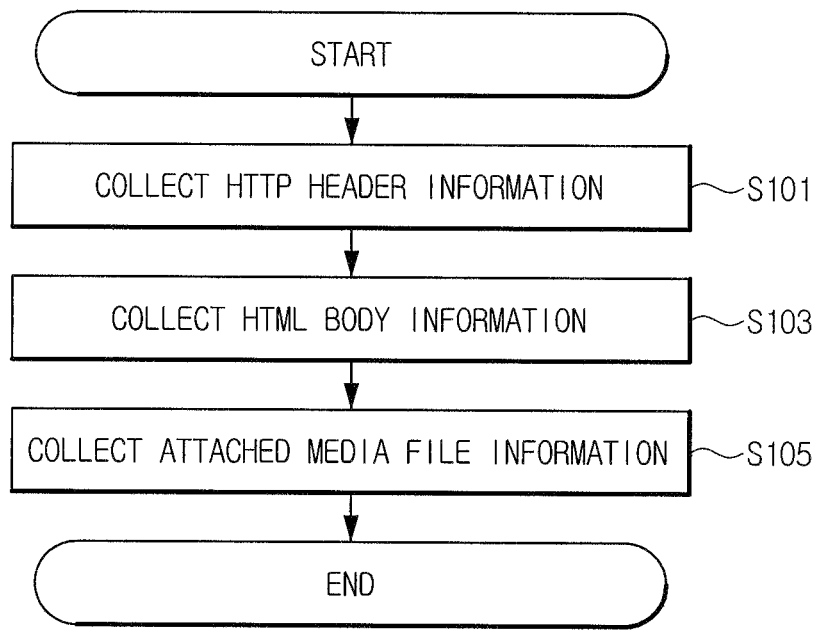
FIG. 3 is a flowchart illustrating a process of collecting MMS message construction information according to an exemplary embodiment of the present invention.

The process of collecting the MMS message construction information performed by the telecommunication terminal 10 in S100 may be performed as illustrated in FIG. 3, which will be described hereinafter. FIG. 3 is a flowchart illustrating a process of collecting MMS message construction information according to an exemplary embodiment of the present invention.

First, the controller 11 of the telecommunication terminal 10 collects the HTTP header information of the MMS message stored in the storage unit 15 to determine how much data is included in the HTTP header (S101).

The controller 11 of the telecommunication terminal 10 collects the HTML body information of the MMS message stored in the storage unit 15 to determine how much data is included in the HTML body (S103). Then, the controller 11 collects the attached media file information of the MMS message stored in the storage unit 15 to determine how much data is included in the attached media file (S105).

Figure 4:
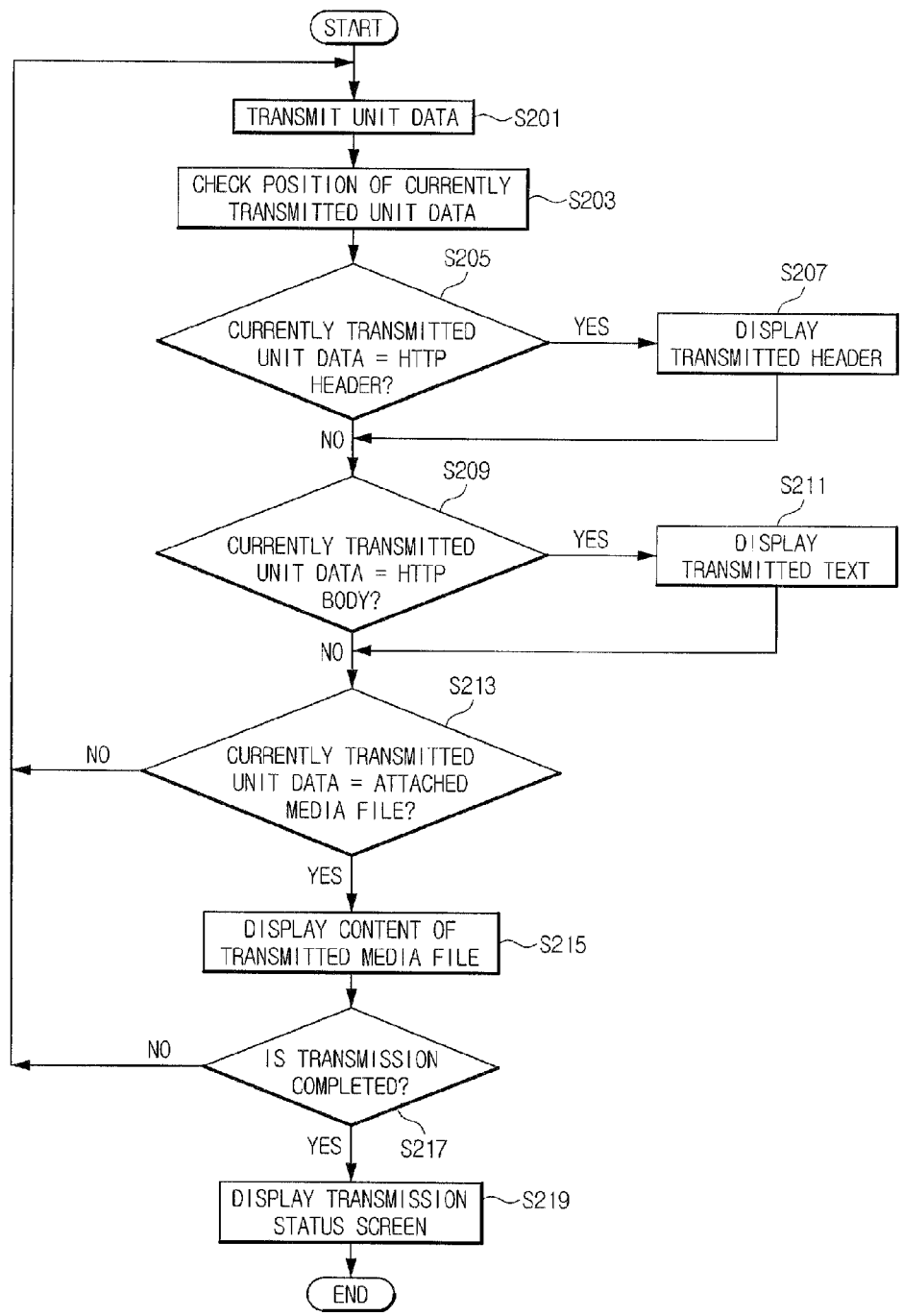
FIG. 4 is a flowchart illustrating a process of displaying a message transmission status according to an exemplary embodiment of the present invention.

In addition, the process of displaying the MMS message transmission status performed by the telecommunication terminal 10 in S200 may be performed as illustrated in FIG. 4, which will be described hereinafter. First, the controller 11 of the telecommunication terminal 10 reads the MMS message from the storage unit 15 by the amount of the set unit data to transmit the MMS message by the communication unit 13. In this case, the MMS message is sequentially read in the order of the HTTP header, the HTML body, and the attached media file that form the MMS message by the amount of the set unit data to transmit the MMS message (S201).

Figure 5A:
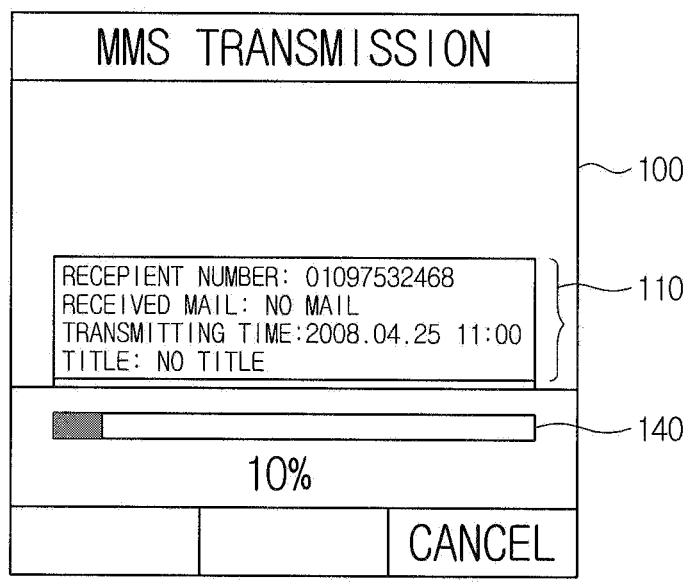
FIG. 5A, FIG. 5B, FIG. 5C, and FIG. 5D illustrate exemplary screens on which MMS message transmission status is displayed according to an exemplary embodiment of the present invention.

The controller 11 checks the portion of the MMS message being currently transmitted based on the above-described collected MMS message construction information (S203). If the currently transmitted unit data corresponds to the HTTP header (S205), the header content of the transmitted part is read from the storage unit 15 and displayed on the display unit 17 (S207). In this case, as illustrated in FIG. 5A, the content 110 of the transmitted header is scrolled from the lower end to the upper end of the screen 100 to be displayed and the transmission progress (shown as, for example, 10% in FIG. 5A) is displayed in the form of the progress bar 140.

Figure 5B:
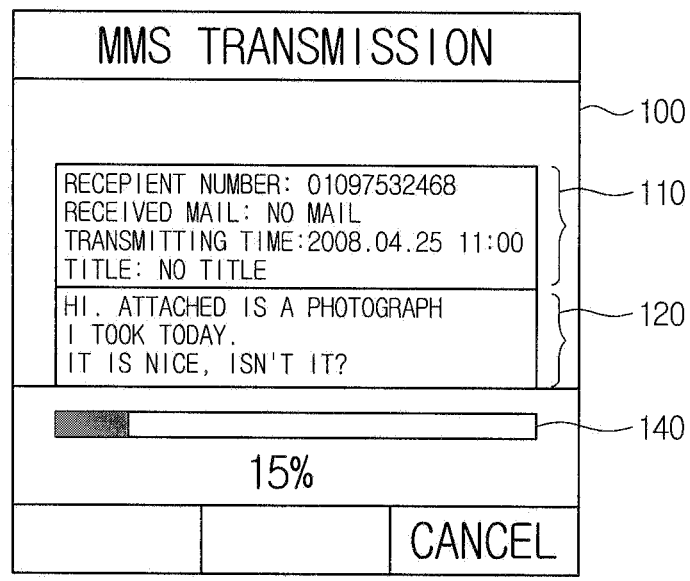

The controller 11 determines whether the currently transmitted unit data corresponds to the HTML body if in S205 the currently transmitted unit data does not correspond to the HTTP header (S209). If the currently transmitted unit data corresponds to the HTML body, the controller 11 reads the content of the text recorded in the HTML body from the storage unit 15 and displays the text content of the transmitted part on the screen of the display unit 17 (S211). In this case, as illustrated in FIG. 5B, the content 120 of the transmitted text is scrolled from the lower end to the upper end of the screen 100 after the header 110 displayed in S207 to be displayed and the transmission progress (shown as, for example, 15% in FIG. 5B) is displayed in the form of a progress bar 140.

Figure 5C:
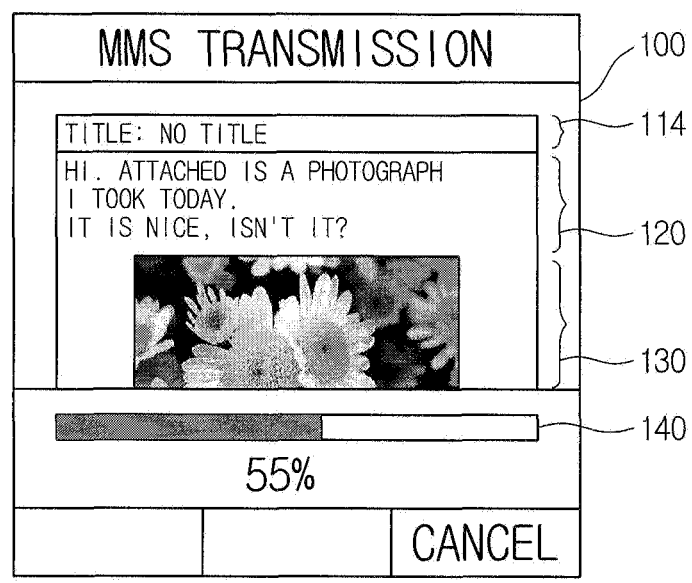

The controller 11 then determines whether the currently transmitted unit data corresponds to the attached media file if it is determined in S209 that the currently transmitted unit data does not correspond to the HTML body (S213). If the currently transmitted unit data corresponds to the attached media file, the controller 11 reads the content of the attached media file of the part transmitted from the storage unit 15 and displays the content of the attached media file on the screen of the display unit 17 (S215). In this case, as illustrated in FIG. 5C, the content 130 of the transmitted attached media file is scrolled from the lower end to the upper end of the screen 100 after the text 120 displayed in S211 to be displayed and the transmission progress (shown as, for example, 55% in FIG. 5C) is displayed in the form of the progress bar 140 (S215).

Figure 5D:
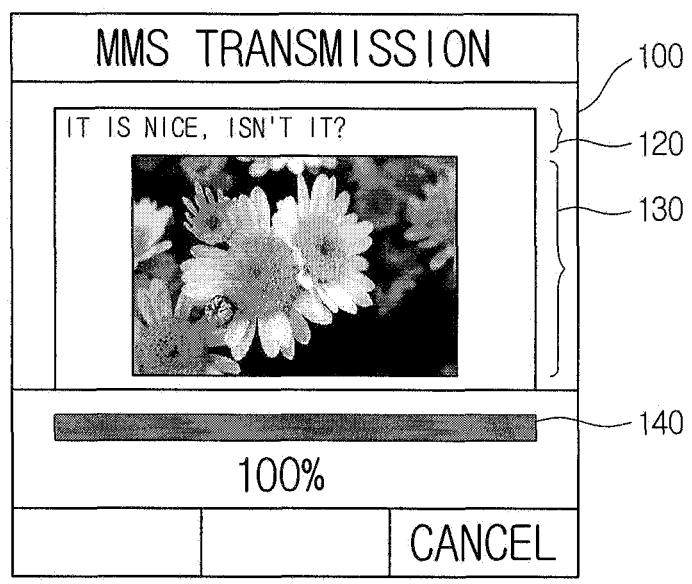

The controller 11 determines whether the transmission of the MMS message has been completed while transmitting the attached media file by the telecommunication unit 13 (S217). If the transmission of the MMS message is complete, as illustrated in FIG. 5D, the controller 11 displays that the transmission progress is 100% in the form of the progress bar 140 on the transmission status screen 100 where the content 130 of the attached media file is displayed after the text 120 (S219). On the other hand, if the transmission of the MMS message is not complete, the process returns to S201 to perform the steps of S201 to S217 repeatedly.

In addition, after S207 is performed, the process proceeds to S209 so that the controller 11 performs an operation. After S211 is performed, the process proceeds to S213 so that the controller 11 performs an operation. When it is determined in S213 that the currently transmitted unit data does not correspond to the attached media file, the process returns to S201 so that the controller 11 performs the steps of S201 to S217 repeatedly.

As described above, when the telecommunication terminal transmits the MMS message, the transmission progress of the MMS message is displayed and the content of the currently transmitted MMS message is displayed so that the user can check which part of the MMS message is transmitted together with the transmission progress of the MMS message.

The method for displaying transmission status of an MMS message and the telecommunication terminal using the method, both as disclosed herein, may be effectively applied to various telecommunication apparatuses for transmitting the message by telecommunication. When the telecommunication terminal transmits the MMS message, the transmission progress of the MMS message is displayed and the content of the currently transmitted message is displayed so that the user can check which part of the current message is transmitted together with the transmission progress of the MMS message. When the MMS message is created erroneously, it is determined that the MMS message is erroneously created by checking the content of the transmitted message while the MMS message is transmitted so that the transmission of the MMS message can be cancelled before completing the transmission of the MMS message. Therefore, the MMS message with the correct content can be transmitted.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for displaying transmitted contents in a mobile terminal, comprising:
    selecting, in the mobile terminal, contents to be transmitted, the contents comprising at least one of image information and video information;
    receiving, from a user through an interface of the mobile terminal, a sending request for the selected contents in a message form;
    transmitting, in response to the sending request, the selected contents sequentially in the message form, the selected contents comprising a first image portion and a second image portion; and
    displaying the selected contents sequentially on a display unit of the mobile terminal while transmitting the selected contents,
    wherein the first image portion of the selected contents is configured to be displayed before completing transmission of the second image portion of the selected contents, and
    wherein the second image portion of the selected contents is configured to be sequentially displayed after displaying the first image portion of the selected contents.

2. The method of claim 1, wherein displaying of the selected contents comprises
    displaying previously transmitted contents while displaying currently transmitted contents on the display unit of the mobile terminal.

3. The method of claim 1, wherein a transmission progress of the selected contents is displayed on the display unit while transmitting the selected contents.

4. The method of claim 1, further comprising:
    in response to a user input, canceling the transmitting of the selected contents before the contents transmission is completed.

5. A mobile terminal to display transmitted contents, comprising:
    an input unit configured to receive, from a user, a selection of contents to be transmitted and a sending request for the selected contents in a message form, the contents comprising at least one of image information and video information;
    a storage unit configured to store the contents;
    a transmission unit configured to transmit, in response to the sending request, the selected contents sequentially, the selected contents comprising a first image portion and a second image portion;
    a display unit configured to display the selected contents sequentially in the message form while the selected contents are being transmitted; and
    a controller configured to control the display unit to display the selected contents,
    wherein the display unit is configured to display the first image portion of the selected contents before completing transmission of the second image portion of the selected contents, and
    wherein the second image portion of the selected contents is configured to be sequentially displayed after displaying the first image portion of the selected contents.

6. The mobile terminal of claim 5, wherein the display unit is configured to display previously transmitted contents while displaying currently transmitted contents.

7. The mobile terminal of claim 5, wherein the controller is configured to control the display unit to display a current transmission progress of the selected contents while the selected contents are being transmitted.

8. The mobile terminal of claim 5, wherein in response to a user input, the controller is configured to cancel a transmission of the selected contents before the contents transmission is completed.

9. The method of claim 1, wherein the first image portion of the selected contents and the second image portion of the selected contents are configured to be sequentially displayed along a direction in which the first image portion of the selected contents and the second image portion of the selected contents are scrolled.

10. The mobile terminal of claim 5, wherein the first image portion of the selected contents and the second image portion of the selected contents are configured to be sequentially displayed along a direction in which the first image portion of the selected contents and the second image portion of the selected contents are scrolled.

11. A first mobile terminal to sequentially display contents while transmitting the contents, comprising:
    an input unit configured to receive, from a user, a selection of contents to be transmitted and a sending request for the selected contents in a scrollable message form, the sending request being a request to transmit a plurality of image portions included in the selected contents to a second mobile terminal;
    a storage unit configured to store the contents;
    a transmission unit configured to transmit, in response to the sending request, the plurality of image portions sequentially to the second mobile terminal, the plurality of image portions comprising a first image portion and a second image portion;
    a display unit configured to display the plurality of image portions sequentially in the scrollable message form while the plurality of image portions are being transmitted sequentially; and
    a controller configured to control the display unit to display the plurality of image portions sequentially,
    wherein the display unit is configured to display, while transmitting the plurality of image portions, the first image portion without displaying the second image portion, and configured to display the second image portion sequentially after displaying the first image portion, and
    wherein the scrollable message form is scrolled as the second image portion is displayed.

12. The mobile terminal of claim 11, wherein the first image portion and the second image portion are configured to be sequentially displayed along a direction in which the first image portion and the second image portion are scrolled.

* * * * *